US006993707B2

(12) United States Patent
Baker et al.

(10) Patent No.: US 6,993,707 B2
(45) Date of Patent: Jan. 31, 2006

(54) DOCUMENT PLACEMARKER

(75) Inventors: David Baker, Portland, OR (US); Walter L. Smith, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 10/710,849

(22) Filed: Aug. 6, 2004

(65) Prior Publication Data

US 2005/0034063 A1 Feb. 10, 2005

Related U.S. Application Data

(60) Provisional application No. 60/493,707, filed on Aug. 8, 2003.

(51) Int. Cl.
*G06F 17/21* (2006.01)

(52) U.S. Cl. ...................................... 715/500; 715/513

(58) Field of Classification Search ..................... None
See application file for complete search history.

(56) References Cited

U.S. PATENT DOCUMENTS 5,659,729 A * 8/1997 Nielsen .................. 715/501.1
5,787,295 A * 7/1998 Nakao ........................ 715/500
6,219,679 B1 * 4/2001 Brisebois et al. ........ 715/501.1
2003/0074416 A1 * 4/2003 Bates et al. ................. 709/217
2004/0205511 A1 * 10/2004 Best et al. ............... 715/501.1

OTHER PUBLICATIONS

Tittel, Ed, et al., HTML 4 for Dummies, pp. 16-17 (IDG Books Worldwide, Inc., ©1998).*
IBM Technical Closure Bulletin, "Online Publication Editing System," vol. 25, No. 06A, pp. 533-537, © Jun., 1993.*
Olsen, Jr., Dan R., "Bookmarks: An Enhanced Scroll Bar," ACM Transactions on Graphics, vol. 11, No. 3, pp. 291-295, © Jul., 1992.*

* cited by examiner

*Primary Examiner*—Doug Hutton
(74) *Attorney, Agent, or Firm*—Anton J. Hopen; Smith & Hopen, P.A.

(57) ABSTRACT

A method of saving and retrieving a selected string on an HTML-based document. A cursor is placed at a location on the document. The number of HTML tags are counted between the beginning of the document and the position of the cursor. The count of HTML tags is saved in association with the URL of the document. When the document at the URL is retrieved at a later time, the string at the location of the previously set cursor is retrieved and communicated to the end user.

7 Claims, 14 Drawing Sheets

DOCUMENT PLACEMARKER

CROSS REFERENCE TO RELATED APPLICATION

This application claims priority to U.S. Provisional Patent Application Ser. No. 60/493,707 filed Aug. 8, 2003 entitled "Method and apparatus for adding Placemarkers to a computer display." The specification and claims of U.S. Provisional Patent Application Ser. No. 60/493,707 are incorporated herein by reference.

FIELD OF INVENTION

This invention relates to data processing and more specifically to accessing, locating and collecting data from a predetermined position in a document.

BACKGROUND OF INVENTION

During the infancy of the World Wide Web (herein "the Web"), documents transferred via hypertext protocol ("HTTP") were frequently static and unchanging over long periods of time. However, as the web evolved, website were more frequently updated and linked to live databases. These new websites became dynamic, changing their displayed output as the linked database was updated. In most cases, database driven web sites maintained a consistent appearance. The tables, colors, fonts and other layout and formatting options were the same. However, the information placed within the layouts would change. Modern development tools such as Microsoft's ASP.NET provides tools to rapidly construct web pages dynamically linked to backend databases.

For the average web users, viewing dynamic data is a convenience. Users check changing stock prices, sports scores, headlines, weather conditions and the like.

In addition, many valuable databases are placed online so that anonymous users have limited access to their resources. The end user must type in a query in a web form which is then assembled into a query string. A SQL string is constructed from the information on the web form and the results are displayed. Sophisticated users and programmers sometimes write applications that "mine" a publicly accessible database to collect the contents of the database for their own use. Although some may question the ethics or legality of such database mining, it is important to note the underlying technology is known as "screen scraping." In other words, the software application uses complex string handling routines to locate dynamically changing data on a website and store the results. Screen scraping has existed well before the advent of the web. Many terminal modes such as 3270, used to connect to mainframes, were "scraped" of data at predetermined locations on the display screen.

To develop such a screen scraping application for the web a programmer will typically examine the HTML source code of the web page near the data element sought to be mined. The programmer will find a string of alphanumeric characters that consistently appears next to the target data element and use that string as a reference point. For example, if an HTML tag calls for a table cell to be a certain background color, the programmer may have the application look for that tag, go three lines down, twenty characters across and copy the next ten characters to a database field. A drawback of this method is that the author of the web page may change the page layout whereby the reference point is no longer valid.

For users with full vision, finding dynamically changing data is typically not a problem. Web sites designers attempt to display the information in a format easy to assimilate. However, visually impaired (also known as "low-vision") users often have difficultly finding a particular portion of a web page. While screen readers assist the visually impaired user by reading the output of a web page, a low-vision user may only want to hear about certain dynamically changing data on a web page. For example, a screen reader on a financial website may take a couple minutes to read the content between the top of the page and the current value of the Dow Jones Industrial Average (the "Dow"). A low-vision user may want to periodically check the Dow to see if the applicable stocks are going up or down for the day. It would be cumbersome to force the user to listen to other content on the page when all he or she wants to know about is the current value of the Dow. Although this information could be "scraped" by examining the HTML source code, writing a custom application for each individual website would also be cumbersome for the low-vision user.

As a user moves though an HTML document downloaded from the Internet with a screen reader, he may want to return to a previously read portion of the document. Unfortunately, currently available screen readers do not provide the capability to return to a specified place within the document, such as a word or line. Instead, the user must return to the beginning of the document and search for the desired location. Therefore, it would be desirable to provide a capability to mark the text of a HTML document with a tag and to be able return to the tagged portion of the text in the future upon demand.

What is needed is a method to locate where dynamically changing information appears on a web page whereby a screen reader can quickly provide the information to the low-vision user.

Another need in the art is for a method of finding the location of this information without requiring the end user to engaging in complex string handing routines.

SUMMARY OF INVENTION

The present invention includes a screen reader that provides access to both software applications and the Internet. The screen reader includes a speech synthesizer that operates with a sound card in a personal computer to read aloud information appearing upon the computer screen. The screen reader provides access to a wide variety of software applications. The reader includes an interface that provides output to refreshable Braille displays.

The screen reader has two cursors available to assist the user when using an application in the operating system, the PC cursor and the screen reader cursor. The PC cursor is linked to the keyboard functions of the software applications and is used when typing information, moving through options in dialog boxes and making a selection of a particular option. Thus, as each key is pressed, the speech synthesizer recites the letter corresponding to the key or the name of the selected option. The screen reader cursor is linked to mouse pointer functions in the software applications to provide access to information in an application window that is beyond the scope of the PC cursor. For example, as the user maneuvers the mouse pointer over a tool bar, the speech synthesizer recites the name of the particular toolbar button that the pointer is over.

In addition, the screen reader supports web browsers with special features such as link lists, frame lists, forms mode and reading of HTML labels and graphic labels included on web pages. Upon entering an HTML document via a URL, the screen reader actuates a virtual cursor that mimics the functions of the PC cursor. The virtual cursor causes the speech synthesizer to speak the number of frames in a document displayed upon the monitor screen and the number of links in the frame currently being displayed. In addition, the speech synthesizer reads graphics labeled by alternate tags in the HTML code.

An embodiment of the present invention includes a method of marking the position of a dynamically changing string in a document including the steps of retrieving the document, establishing a cursor location in the document associated with the beginning of the dynamically changing string, parsing the source HTML in the document for a positional value representative of the number of HTML tags prior to the cursor location, identifying the URL of the document, and storing the value and the URL on a computer accessible medium. Additional steps include retrieving the positional value and URL from the computer accessible medium, requesting the document associated with the URL, parsing the source HTML in the document until the quantity of tags parsed equals the positional value, and outputting the dynamically changing string at the cursor location. The step of outputting the dynamically changing string at the cursor location may be executed by an output means selected from the group consisting of a speech synthesizer, a Braille reader, a screen magnification application, and a pop-up display window. Outputting the dynamically changing string may be performed responsive to navigation to the associated URL. A position for an entire domain may also be stored whereby common headers that propagate across an entire domain are bypassed so that the cursor is positioned at content that is distinct between web pages in the domain.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The present invention is directed toward a method and apparatus used in conjunction with screen reading software, such as the JAWS® screen reader, available from Freedom Scientific, for providing text markers for a document obtained from an outside source, such as, for example, the Internet. These text markers are referred to as "Placemarkers" in the following description. The Placemarkers are relative locations in a virtual document that corresponds to the original document. The virtual document and virtual PC cursor are driven by a virtual buffer—a textual representation of what appears on a web page. The virtual buffer is created by parsing the HTML of the page and then generating text that both describes the page in terms of headings, tables, etc. and which flattens items such as multicolumn text. What ends up in the virtual buffer is the equivalent of what a human would read aloud when asked to read a web page to a blind person. For every character of the text in the virtual buffer, a pointer back to the inner-most HTML element is maintained that encloses it. These pointers are in a parallel array to the array of text. From that HTML element it is possible to query both its siblings and its parent. This allows the application to move from any element of an HTML document to any other.

For example, when using Microsoft Internet Explorer, a user clicks a location on the screen. The JAWS® application calls the Microsoft supplied ElementFromPoint function to find the inner-most HTML element that encloses the character clicked. The application then looks for this element in the array of elements described above, and moves the cursor in the virtual buffer to the first enclosed character of that element.

The Placemarkers are stored in a separate Placemarker file, such as in a user's personal computer. The Placemarkers remain unknown to the outside source of the document being read, but are known to the screen reading software. The Placemarkers are stored using document structural information which is known to the screen reading software. While the following description refers to use with personal computers, it will be appreciated the invention also may be practiced with other similar devices, such as, for example, PAC Mate, a personal data assistant for the visually impaired.

Figure 1:
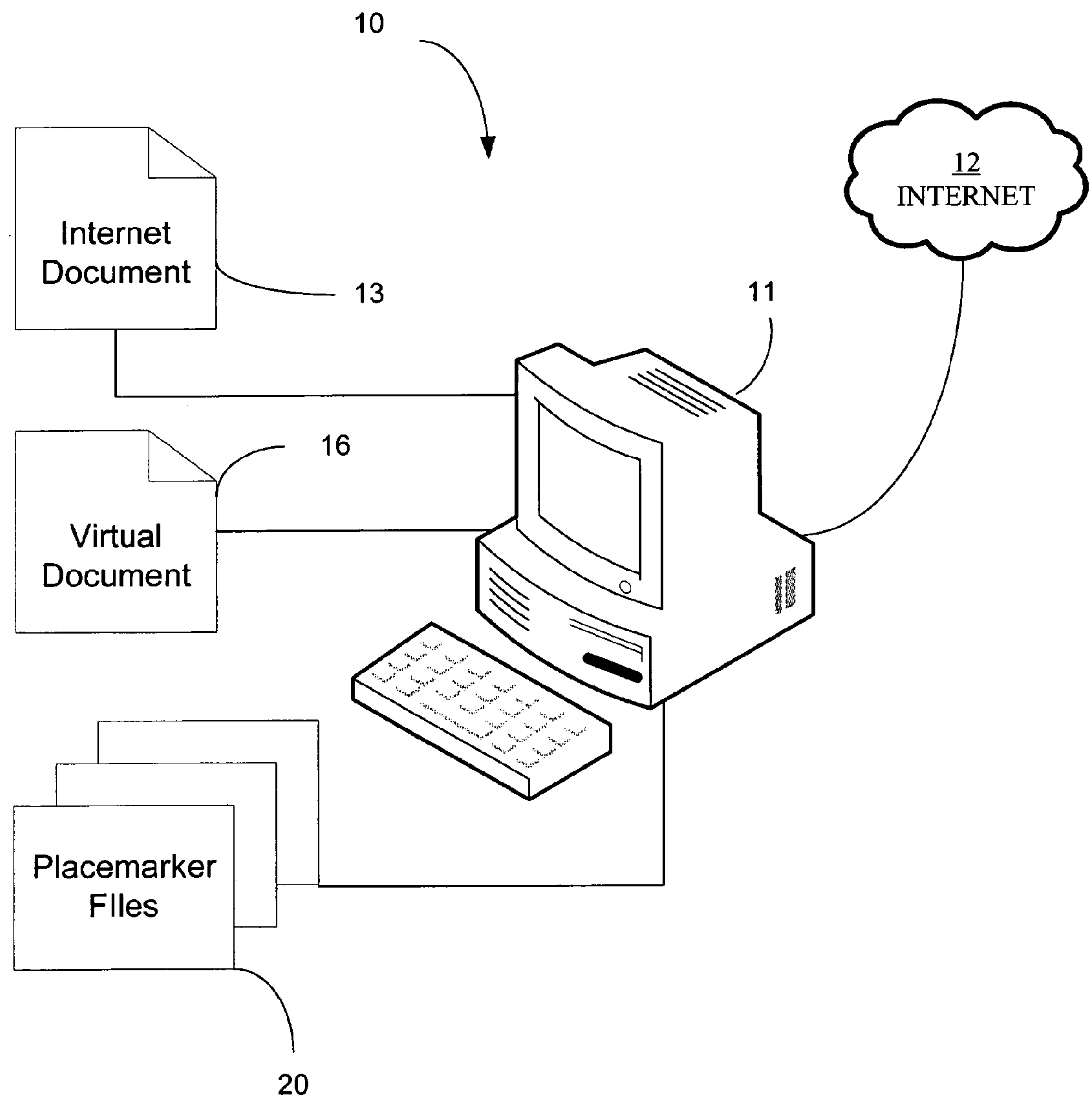
FIG. 1 is a schematic diagram illustrating the present invention as applied to a personal computer connected to the Internet.
Figure 2:
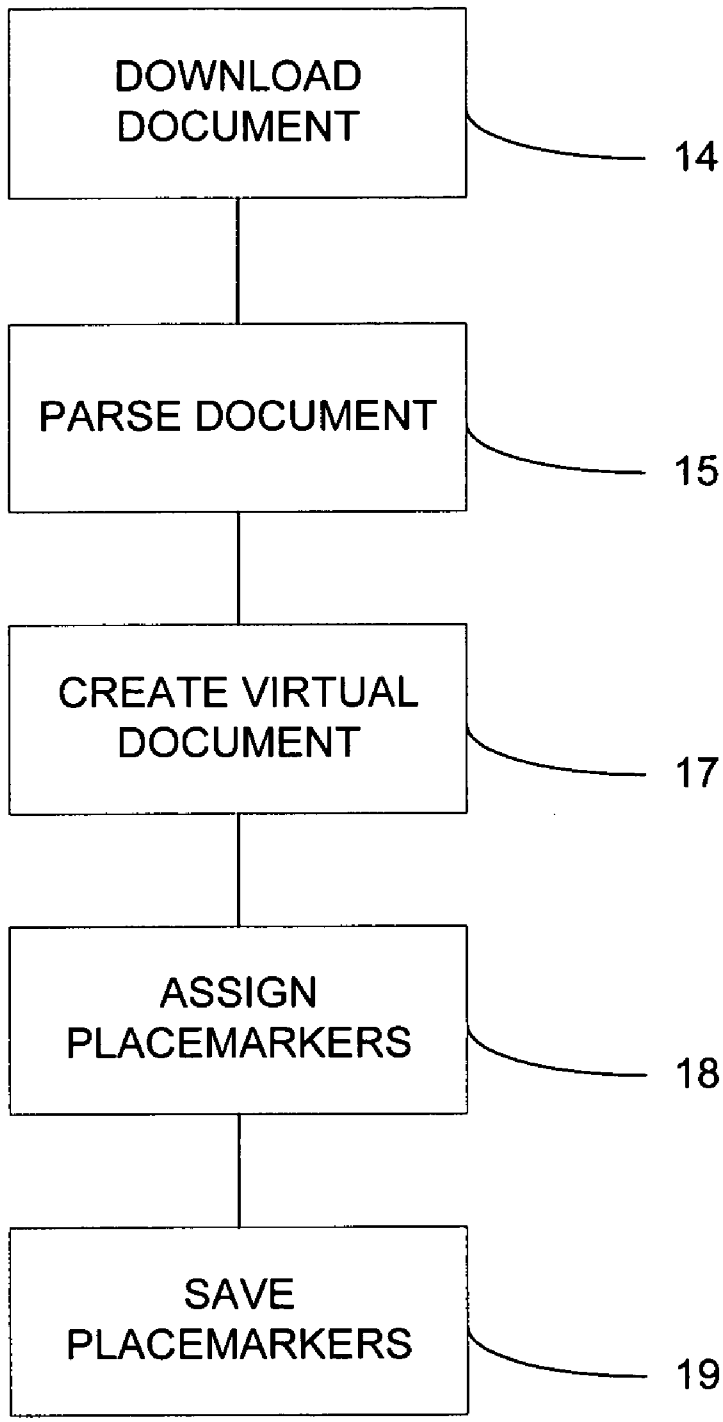
FIG. 2 is a flow chart illustrating the operation of the personal computer shown in FIG. 1.

Referring now to the drawings, there is shown in FIG. 1, a workplace or home computer installation 10 with a personal computer 11 connected by conventional access hardware to the Internet 12. The personal computer is equipped with screen reading software, such as the JAWS® screen reader. A flow chart illustrating the operation of the present invention is shown in FIG. 2. Following connection to the Internet 12, the computer user can download material, such as a document 13 from the Internet. The document 13 is displayed upon the computer monitor screen. The downloading of the document 13 is shown in functional block 14 of FIG. 2. The JAWS® screen reader is operative to parse the document 13 in functional block 14 of FIG. 2 to locate any hidden and/or embedded markup tags. Such tags are commonly used by HTML, XML. Java Script and other embedded scripts when the original source documents are created. Following the parsing, JAWS® screen reader then creates a virtual document 16 in functional block 17 that corresponds to the original source document, but has available the embedded tags to aid in navigating the virtual document 16. The virtual document 16 referred to above is a document hosted by an application that does not in and of itself use a visible caret, but does enable usage of the common navigation keys found in Word Processors, such as the arrow keys and combinations of keys with control, alt or shift. Neither the original document, such as, for example, a web page, nor the host application, such as Internet Explorer, are virtual. The JAWS® screen reader also creates a virtual cursor as a soft cursor that is used by the software for navigation purposes within the virtual document, as explained earlier in this document.

Besides the standard navigation and selection commands, the virtual cursor also provides many features that aid quicker navigation and contextual exploration. The present invention contemplates adding Placemarkers as another such feature. All of the features associated with the virtual cursor allow navigation (Move To) either on a single keystroke or by selecting the desired item from a list. Except for the Placemarkers, the features depend on the existence of corresponding elements within the Virtual Document for user benefit. Returning to FIG. 2, the present invention contemplates assigning Placemarkers within the virtual document 16 in functional block 18. The invention further contemplates that the Placemarkers are associated with the embedded document tags. Because the Placemarkers are keyed to the architecture of the document, they are independent of the document text. Additionally, fixed Placemarkers are saved in functional block 19 to a separate file 20 shown in FIG. 1 that corresponds to the document in order to preserve the Placemarkers for future use.

Unlike other previously developed features of the Virtual Cursor, Placemarkers creates an environment in which the user can define, change, rename and remove new or existing locations, themselves called Placemarkers, for the active Virtual document. The present invention contemplates that in most, if not all cases, the Virtual Document is accessed (read and interacted with, in the case of a form), but the document is not modified by the user. Thus, while the Virtual Document's content may change at any time, the structure remains the same and the Placemarkers are not effected by the changes.

The Placemarkers are quite different from prior art bookmarks, which are created by the user or developer of a document under an assumption that the document will not change structurally or in content without the bookmark's creator knowledge. With regard to a Placemarker, the Placemarker user not be aware of when the Virtual document changed or what changed. For example, in a Word Processor, Bookmarks can be used to create a Table of Contents, where the author/document developer is thoroughly aware of the document's structure and content. For a Placemarker user, the Virtual Document is one means by which to gather information that may be updated frequently, such as favorite sports scores, TV guide or latest specials. With conventional Bookmarks in a word processor, the bookmark is stored in the document or another file known to the word processor itself. With Placemarkers, the Virtual Document's host application does not have any information concerning the Placemarkers unless that Placemarker is specifically designed to activate a script or command within the document or application. In order to understand the significance of this difference, the Placemarker is compared it to a feature found in the average word processor, and one found in the average web browser, with the differences highlighted.

With respect to a web browsing application, the bookmark points to a specific document, or location in document. In most cases, the bookmark points to a specific document via Uniform Resource Locator (URL) as prescribed by the developer of the web site. When the bookmark points to a location within a document, it is through the same method, using a URL. In contrast, the Placemarker, although usable on the Internet, points to a structural location within a page or any series of pages on the same web site. For example, if there is a blue box on every page of a given web site with new information, this spot can be marked once and the Placemarker will locate the same blue box on all the pages located at the site where it is found. This is true even if the content in the box changes as the user explores the web site.

Thus, the Placemarker is by definition a location, structural or otherwise, defined and accessed by associated screen reader software, such as JAWS®. The host application of the Virtual Document has no relationship with the Placemarker. Unless the screen reader user is the developer of the web site or other Virtual Document, the document's creator, whether human or computer generated, there is no relationship between the document creator and the Placemarker itself. The invention contemplates that Placemarker usage includes structural locations in the Virtual document where important information is updated, either interactively by the user (form and input controls in document), or automatically without the user's knowledge. The invention also contemplates that users of Placemarkers will have the opportunity to copy and share Placemarker files which pertain to specific documents or web sites.

Figure 3:
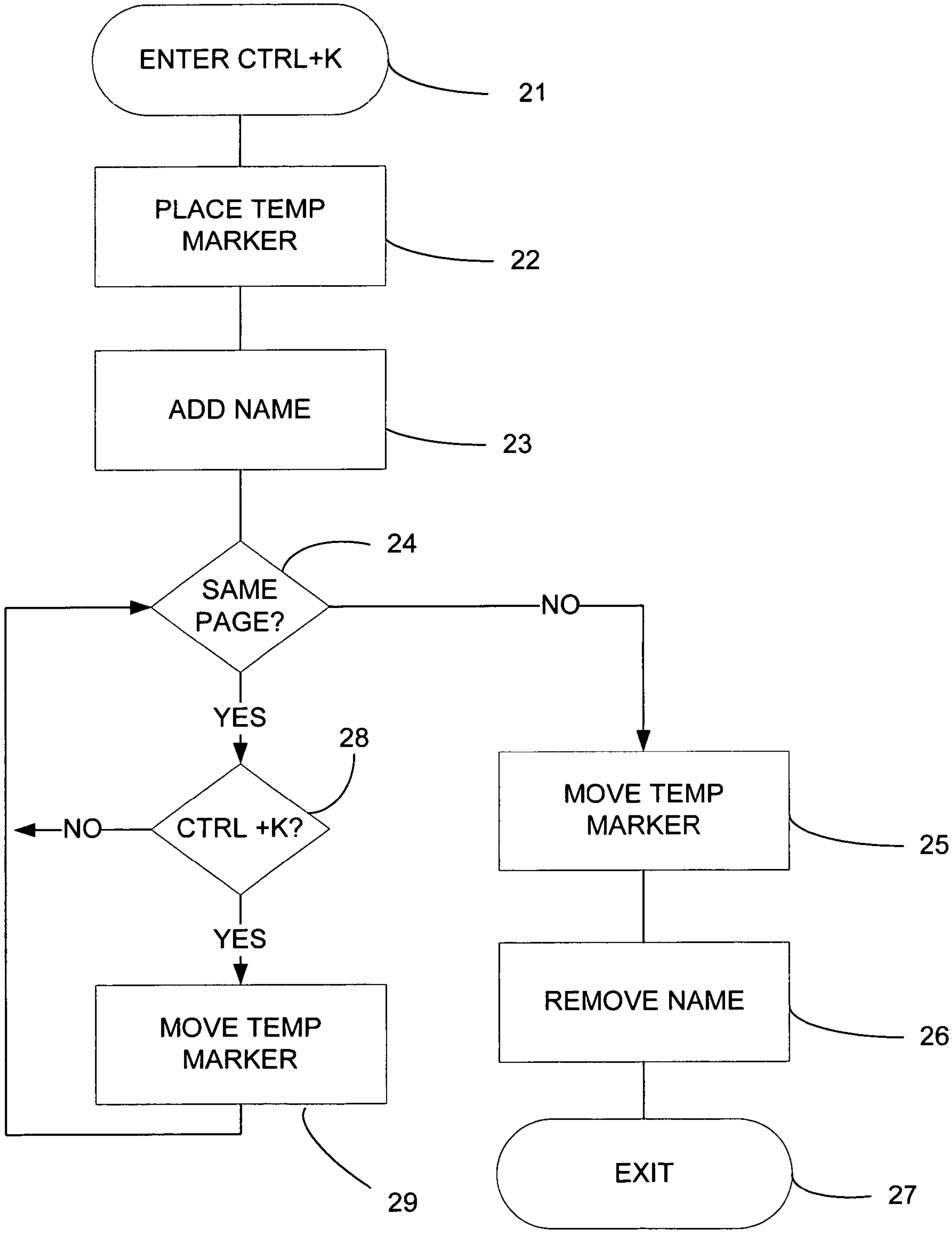
FIG. 3 is a flow chart illustrating placement of a temporary Placemarker in accordance with the invention.

The present invention contemplates providing Placemarkers that would allow the user of a screen reader to designate a place in a document line of text or a portion of a screen for future access. The invention further contemplates two types of Placemarkers, fixed and temporary. Referring again to the drawings, there is illustrated in FIG. 3, a flow chart for an algorithm for inserting a temporary Placemarker in a HTML document that is in accordance with the invention. The algorithm is entered through box 21 when the user simultaneously depresses the CTRL and K keys on his keyboard. In response, the algorithm inserts a temporary marker in a JAWS® file that corresponds to the current location of the Virtual PC Cursor, as shown in functional box 22. Thus, the Placemarker of the present invention differs from conventional text bookmarks, such as in Microsoft Word®, in that the user can return to the marked position even if the data on the page has been changed. Also, by utilizing the Virtual PC Cursor, the user can insert Placemarkers into documents that do not have a keyboard accessible cursor, such as a flashing vertical line. The algorithm then advances to functional block 23 where the temporary Placemarker is added to a list of Placemarker names, that will be described below, under the name "Temporary". The user can then return to the location of the temporary Placemarker, as also will be explained below.

The temporary Placemarker is maintained as long as the user remains upon the current page. Hence, the algorithm advances to decision block 24 where it is determined whether the user is still on the same page. If the user has moved to another page, the algorithm transfers to functional block 25 where the temporary Placemarker is removed from the previous document page. The algorithm continues to functional block 26 where the "Temporary" name is deleted from the list of Placemarker names. Once deleted, the temporary Placemarker will not be present should the user return to the previously viewed page of the document. The algorithm then ends by passing through exit block 27. If, in decision block 24, the algorithm determines that the user is still on the same page, the algorithm transfers to decision block 28.

In decision block 28, the algorithm determines whether the user has depressed the CTRL and K keys a second time. If the user has depressed the CTRL and K keys a second time, the algorithm transfers to functional block 29 and moves the temporary Placemarker to the current location of the Virtual PC Cursor. The algorithm then returns to decision block 24 to again check as to whether the user is still on the same page of the document. If, in decision block 28, the user has not depressed the CTRL and K keys a second time, the algorithm simply returns to decision block 24 to again check as to whether the user is still on the same page of the document. As long as the user remains on the same page, the temporary Placemarker will again be moved to the current location of the Virtual PC Cursor each subsequent time the CTRL and K keys are depressed.

Figure 4:
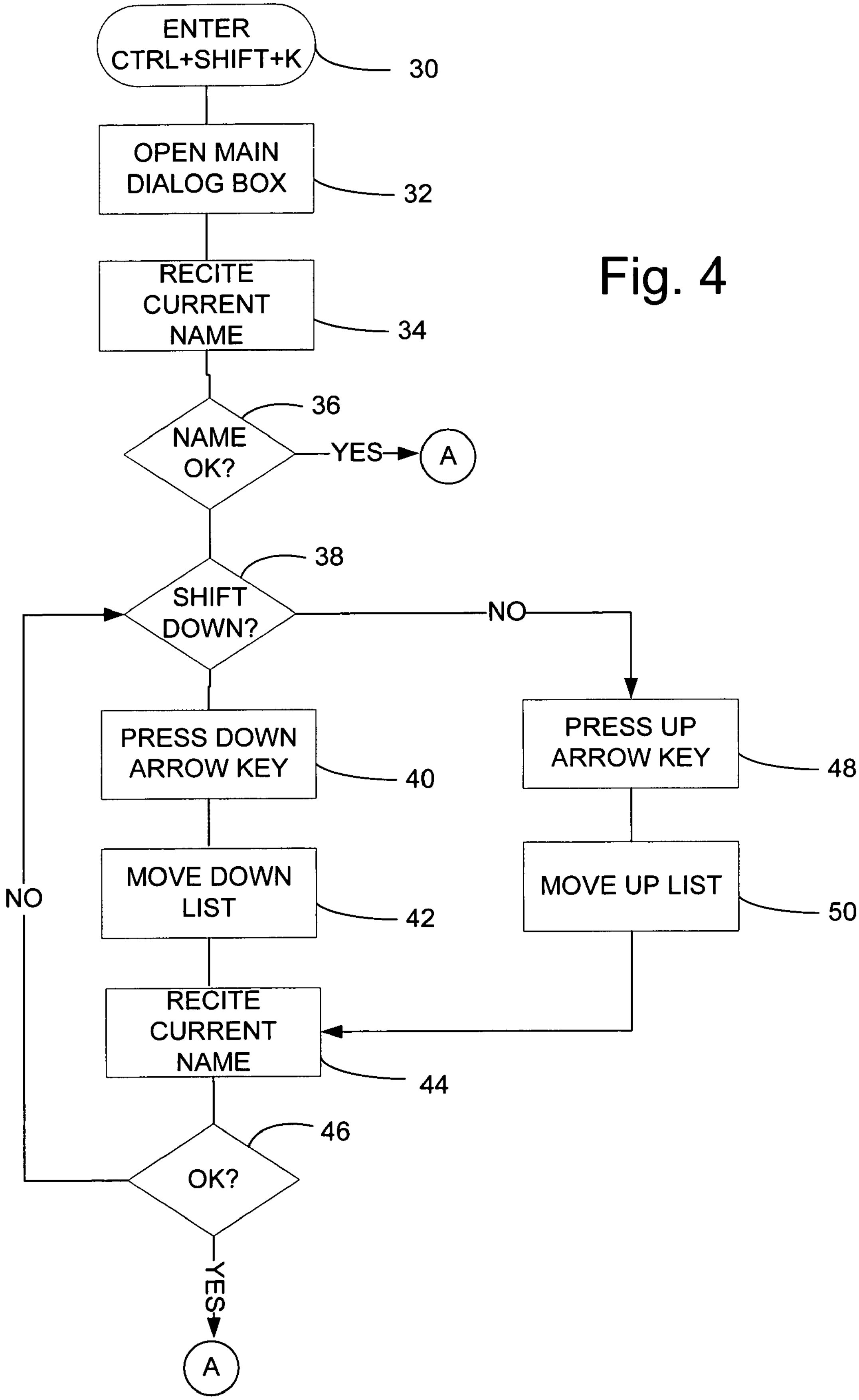
FIG. 4 is a flow chart illustrating selection of a fixed Placemarker in accordance with the invention.
Figure 5:
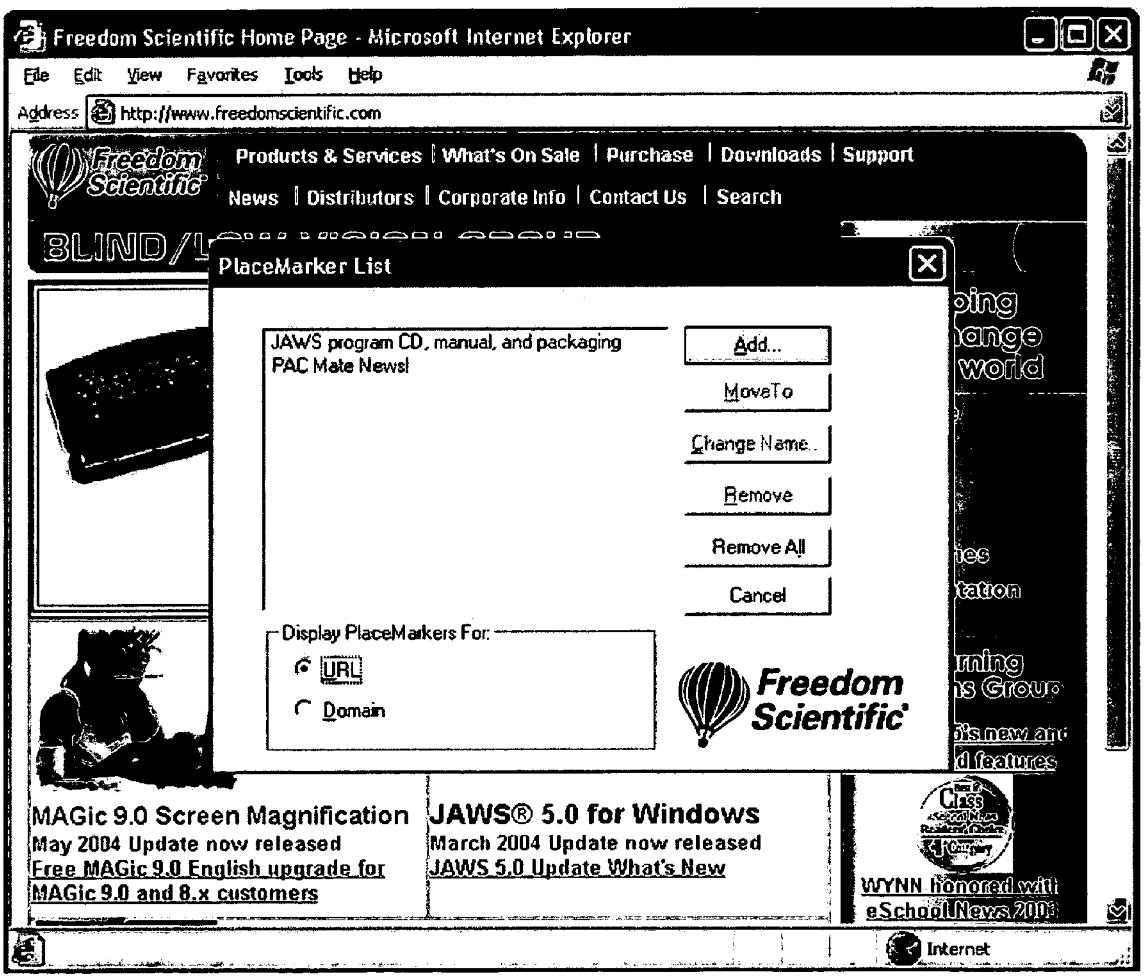
FIG. 5 illustrates a monitor screen display utilized by the flow chart shown in FIG. 4.

As indicated above, the invention also contemplates inserting fixed Placemarkers into a HTML document. Referring again to the drawings, there is illustrated in FIG. 4, a flow chart for an algorithm for inserting a such a fixed Placemarker that is in accordance with the invention. The algorithm is entered through box 30 when the user simultaneously depresses the CTRL, SHIFT and K keys on his keyboard. In response, the algorithm advances to functional block 32 where a "Placemarker List" dialog screen as shown in FIG. 5 is opened. The dialog screen includes a plurality of command buttons that will be described below and also displays the current list of named Placemarkers, as illustrated in FIG. 5. If there are no current Placemarkers, the name display will be blank and user may proceed to use the buttons, as will be described below. If there are current Placemarkers, the last one added or used will be highlighted. The algorithm advances to functional block 34 where the JAWS® speech synthesizer reads the highlighted Placemarker name. The algorithm then advances to decision block 36 where the user decides whether the highlighted Placemarker name is acceptable. If the name is acceptable, the user continues through the transfer point labeled "A" to the flow chart shown in FIG. 6. If the highlighted Placemarker name is not acceptable, the invention allows the user to shift up or down the list of current Placemarker names to find the desired one.

Accordingly, the algorithm advances to decision block 38 where the user decides whether he wants to shift down the list. If the user wants to shift down the list, he presses the down arrow key on his keyboard, as shown in functional block 40. In response to the down arrow keystroke, the algorithm moves the highlight down to the next listed Placemarker name in functional block 42. The algorithm then advances to functional block 44 where the JAWS® speech synthesizer reads the newly highlighted Placemarker name. The algorithm then advances to decision block 46 where the user decides whether the newly highlighted Placemarker name is acceptable. If the name is acceptable, the user continues through the transfer point labeled "A". If the name is not acceptable, the user returns to decision block 38. Upon returning to decision block 38, the user may shift further down the name list by again depressing the down arrow key.

If, in decision block 38, the user does not want to shift down, the alternative is to shift up the name list by pressing the up arrow key on the keyboard, as shown in functional block 48. In response to the up arrow keystroke, the algorithm moves the highlight up the name list to the next listed Placemarker name in functional block 50. The algorithm then advances to functional block 44 where the JAWS® speech synthesizer reads the newly highlighted Placemarker name. The algorithm then advances to decision block 46 where the user decides whether the newly highlighted Placemarker name is acceptable. As before, if the name is acceptable, the user continues through the transfer point labeled "A". If the name is not acceptable, the user again returns to decision block 38. Upon returning to decision block 38, the user may shift further up the name list by again depressing the up arrow key.

While three decision blocks 36, 38 and 46 are shown in FIG. 4, it will be appreciated that the decision blocks are illustrative of an interactive association between the user and the algorithm, as described above. Thus, in the preferred embodiment, the decisions are made by the user pressing either the up arrow or down arrow keys on his keyboard or one of the command buttons on the dialog box.

The invention also contemplates an alternate method for selecting a Placemarker name in which the user may simply presses the key corresponding to the first letter of the desired Placemarker name in place of deciding whether to shift up or down the displayed list of names in decision block 38 (not shown). Pressing the key corresponding to the first causes the algorithm to move to that name on the list. Thus, pressing the "T" key will transfer the user to the Temporary Placemarker, if one is included in the name list. The newly selected name is then recited as before. If the recited name is acceptable, the user continues through the transfer point labeled "A". If the recited name is not acceptable, the user may either depress another key or return to decision block 38.

Figure 6:
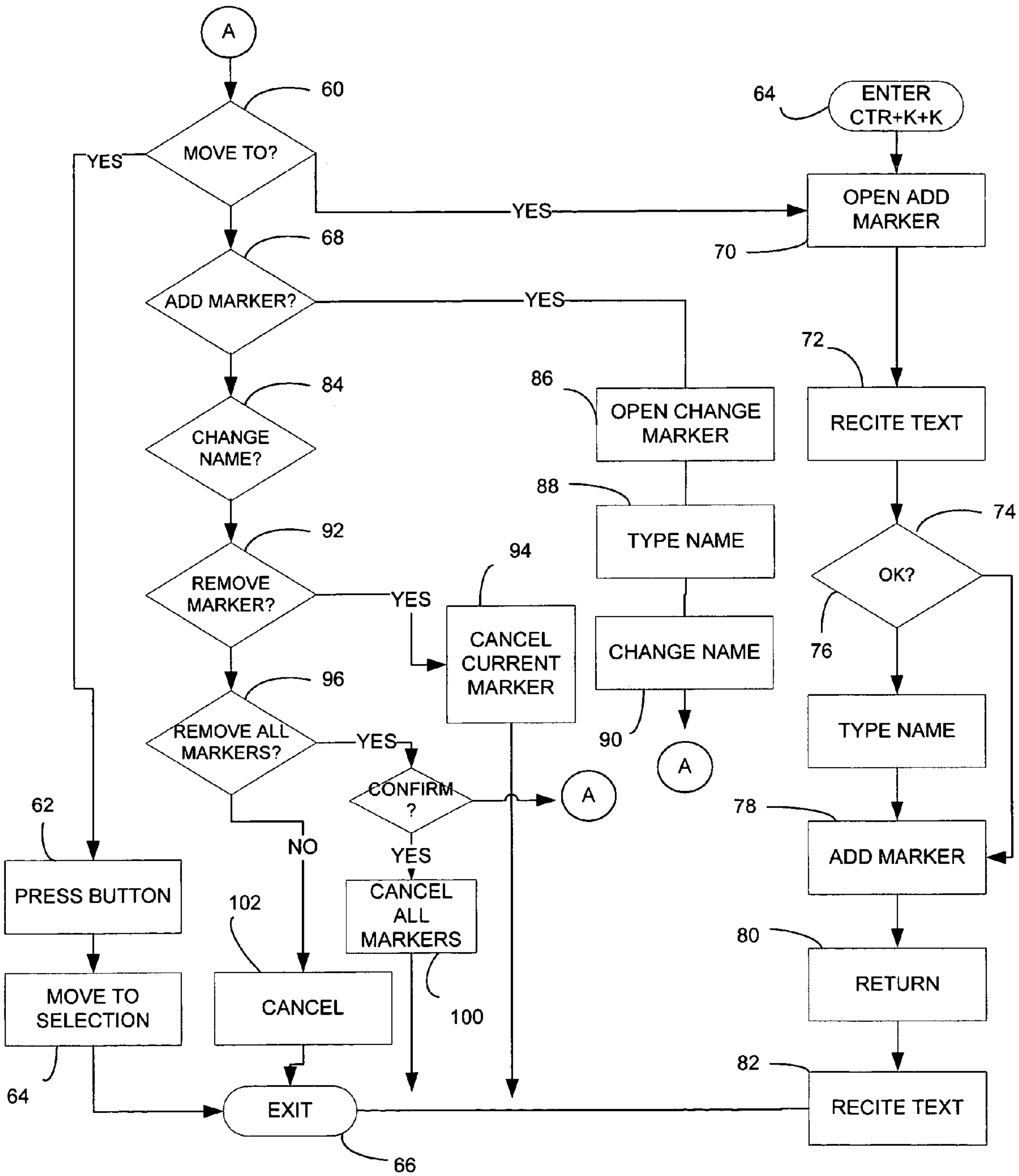
FIG. 6 is a flow chart illustrating placement of a fixed Placemarker and other operations available in accordance with the invention.

Upon passing through the transfer point A, the algorithm continues with the flow chart shown in FIG. 6. As indicated above, there are six labeled command buttons shown to the right of the display screen in FIG. 5 while two option buttons are shown at the bottom of the screen. Corresponding to upper five command buttons, there are five decision blocks included to the left of FIG. 6. These decision blocks, which are described in the following, correspond to the user selecting and pressing the corresponding command button. Thus, while the decision blocks are shown and described insequence in the flow chart of FIG. 6, the invention contemplates that the user may proceed directly to any one of the command buttons. The command buttons are sequentially selected by depressing the tab key on the keyboard. After the tab key is depressed, the JAWS® speech synthesizer reads the control key label to inform the user of the currently selected command button selection. Pressing the enter key on the keyboard depresses the selected command button. Alternately, a key associated with the underlined letter in the label for each of the display command buttons may be utilized to select and press the button. For example, pressing the A key while holding down the ALT key will select and press the "Add" command button.

When the Placemarker List dialog box is first opened, the "Move To" command button is currently selected if a Placemarker name is selected, as illustrated by decision block 60. The invention contemplates that the "Move To" command button is only available if one or more Placemarkers are listed on the screen. If there are no designated Placemarkers, the "Move To" button will be grayed out and thereby not available. If the user wants to move to the location corresponding to the selected Placemarker, he depresses the enter key on his keyboard to depress the "Move To" button on the display screen, as indicated by functional block 62. The algorithm then advances to functional block 64 and moves to the location in the document corresponding to the selected Placemarker name. The JAWS® speech synthesizer would then recite the line of the document for the selected location to provide audio feedback to the user. The algorithm advances to exit block 66 where the dialog box is closed and the algorithm terminates.

Figure 7:
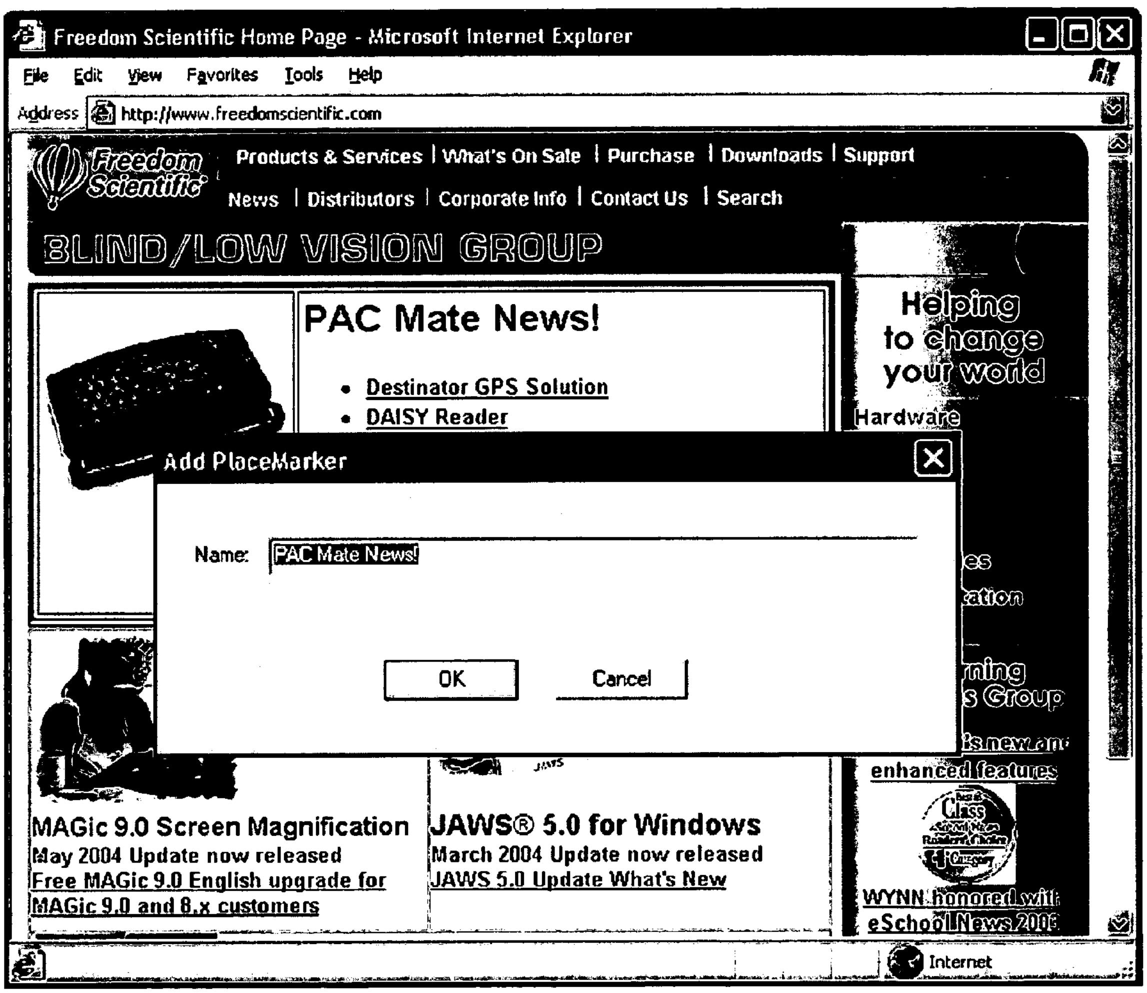
FIG. 7 illustrates a monitor screen display for adding a Placemarker that is utilized by the flow chart shown in FIG. 6.

The next command option to be discussed is the "Add" option that appears at the top of the set of command buttons included in the Placemarker List dialog box shown in FIG. 5. The "Add" button will insert a fixed Placemarker into a JAWS® file that corresponds to at the current location of the Virtual cursor and also add a name corresponding to the new Placemarker to the list shown on the dialog box display screen. The "Add" option is accessed in decision block 68 by selecting the Add button and depressing the ENTER key on the key board. This action causes the algorithm to open an "Add Placemarker" dialog box, as shown in functional block 70 and illustrated in FIG. 7. The Add Placemarker dialog box has one edit field that is used to specify the name of the new Placemarker. If the user has marked a blank field in the document, the edit field also will be blank Otherwise a portion of the document text at the location of the Virtual cursor will be displayed in the edit field as a default Placemarker name. The Add Placemarker dialog box also includes two command buttons labeled "OK" and "CANCEL". When the dialog box is opened, the OK button is selected as a default setting.

The algorithm advances to functional block 72 in which the JAWS® speech synthesizer recites the current contents of the of the edit field. The algorithm then advances to decision block 74 where the user decides whether or not to use the default name displayed in the edit field. The user can reject the default name by typing a name into the edit field in functional block 76. The user then depresses the ENTER key on the keyboard in functional block 78 to press the OK button in the dialog box. Upon depressing the ENTER key, the algorithm inserts a fixed Placemarker into the document and adds the name in the edit line to the list of Placemarker names. The algorithm then advances to functional block 80 and moves to the location in the document corresponding to the new Placemarker name. The JAWS® speech synthesizer would then recite the line of the document for the selected location to provide audio feedback to the user, as shown in functional block 82. The algorithm advances to exit block 66 where the "Add Placemarker" dialog box is closed and the algorithm terminates. i, in decision block 74, the user is satisfied with the default name appearing in the edit line in the Add Placemarker dialog box, he depresses the ENTER key to transfer the algorithm directly to functional block 78 to add the marker to the document at the current location of the Virtual cursor and the default name to the name list. As with the temporary Placemarkers, by utilizing the Virtual PC Cursor, the user can insert fixed Placemarkers into documents that do not have a keyboard accessible cursor, such as a flashing vertical line.

As described above, the "Add Placemarker" dialog box also includes a CANCEL command button. The CANCEL button may be selecting with the tab key at any time that the "Add Placemarker" dialog box is open. After selecting the CANCEL button, depressing the ENTER key will close the dialog box and exit the algorithm. The present invention also includes a shortcut to access the "Add" option directly from the HTML document. The shortcut is illustrated in the upper right corner of FIG. 6 and consists of the entry box labeled 84. Entry box 84 indicates that depressing the K key twice within one second while holding down the CTRL key will open the "Add Placemarker" dialog box directly from the document. The "Add Placemarker" dialog box may then be used as described above to add a fixed Placemarker to the document without having to first open the Placemarker dialog box shown in FIG. 5.

Figure 8:
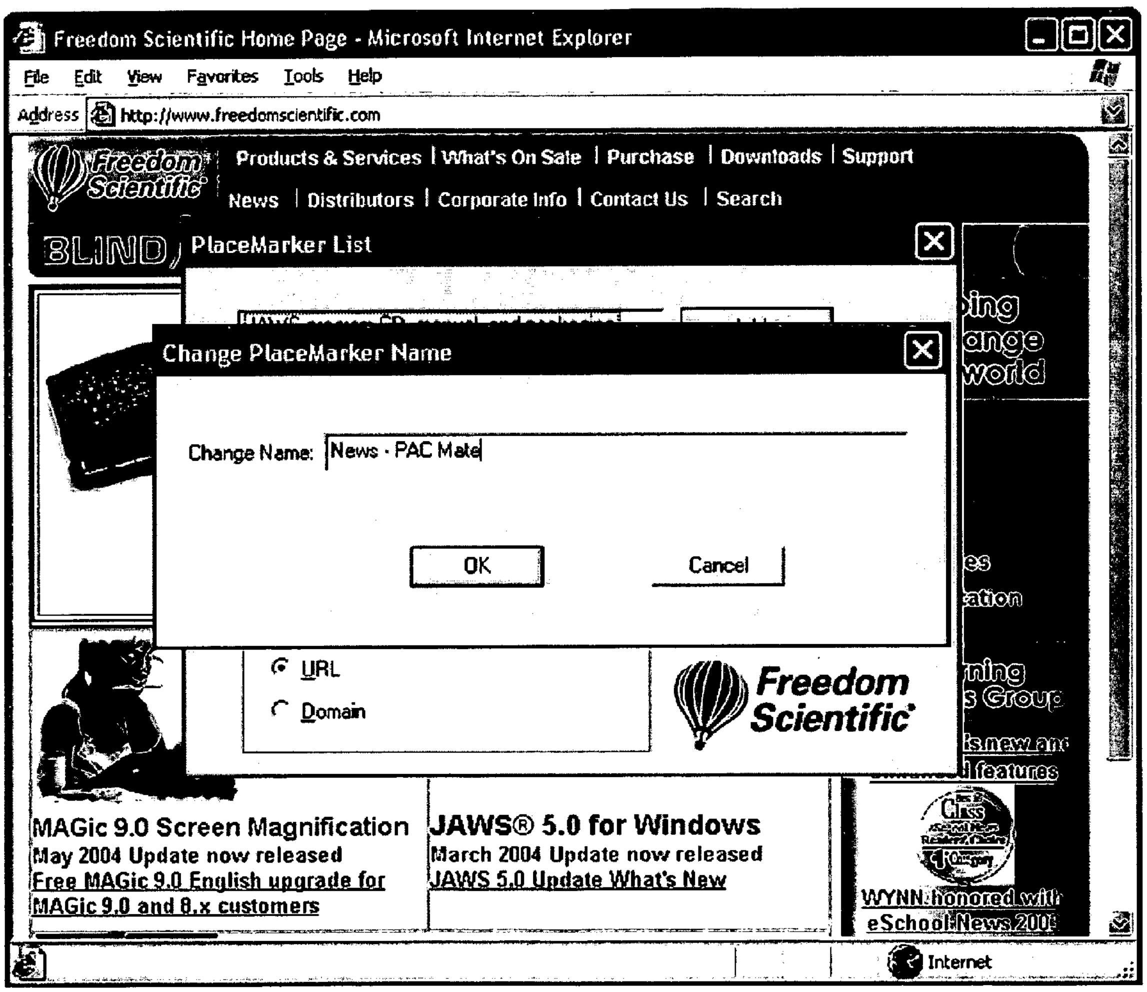
FIG. 8 illustrates a monitor screen display for changing a Placemarker name that is utilized by the flow chart shown in FIG. 6.

The next control option to be discussed is the "Change Name" option that appears third from the top of the set of command buttons included in the Placemarker List dialog box shown in FIG. 5. Selecting the "Change Name" button and depressing the ENTER key in decision block 84 opens a "Change Placemarker Name" dialog box over the Placemarker List dialog box, as shown in functional block 86 and illustrated in FIG. 8. The Change Placemarker Name dialog box has one edit field that displays the currently selected Placemarker name. Similar to the Add Placemarker dialog box, the Change Placemarker Name dialog box also includes two command buttons labeled "OK" and "CANCEL". When the dialog box is opened, the OK button is selected as a default setting. The algorithm then advances to functional block 88 where the user types in a new name. Pressing the ENTER key in functional block 90 changes the name of the fixed Placemarker, closes the Change Placemarker Name dialog box and returns the algorithm to the PlaceMaker List dialog box through transfer point A. As described above, the Change Placemarker Name dialog box also includes a CANCEL command button. The CANCEL button may be selected with the tab key at any time that the "Change Name" dialog box is open. After selecting the CANCEL button, depressing the ENTER key will return the algorithm to the PlaceMaker dialog box through transfer point A.

The present invention contemplates that the "Change Name" dialog box may be used to convert a Temporary Placemarker to a fixed Placemarker by changing the name of the Temporary Placemarker.

The next command option to be discussed is the "Remove" option that appears fourth from the top of the set of command buttons included in the Placemarker List dialog box shown in FIG. 5 and is used to remove the currently selected Placemarker from the document. Selecting the "Remove" button and depressing the ENTER key in decision block 92 transfers the algorithm to functional block 94 where the currently selected Placemarker is removed from the document and the associated name is deleted from the list displayed in the Placemarker dialog box. The algorithm then exits through box 66. If there are no Placemarkers in the document, the "Remove" command button will be grayed out and not available for use.

The final command option to be discussed is the "Remove All" option that appears fifth from the top of the set of command buttons included in the Placemarker List dialog box shown in FIG. 5 and is used to remove all of the Placemarkers, both fixed and temporary, from the document. Selecting the "Remove All" button and depressing the ENTER key in decision block 96 transfers the algorithm to decision block 98 where a dialog box (not shown) appears to confirm the command by presenting a message that reads: "Are you sure you want to remove all Place Markers?" The JAWS® speech synthesizer recites the message for the user. The user uses the tab key to select either a YES button or a NO button included in the dialog box and then presses the ENTER key. Pressing the NO button returns the user to the Placemarker dialog box via the transfer point A. Pressing the YES button advances the algorithm to functional block 100 where all of the Placemarkers are removed from the document and all of the corresponding Placemarker names are deleted from the list of names displayed in the Placemarker List dialog box. The algorithm then exits through box 66. If there are no Placemarkers in the document, the "Remove All" command button will be grayed out and not available for use.

As shown in FIG. 5, the Placemarker List dialog box also includes a CANCEL command button in the functional block labeled 102. While the block 102 is shown below the decision blocks discussed above, the CANCEL button may be selecting with the tab key at any time that the Placemarker List dialog box is open. After selecting the CANCEL button, depressing the ENTER key will close the dialog box and terminate the algorithm through exit box 66.

The Placemarker List dialog box also includes a pair of option buttons at the bottom of the box. The option buttons specify whether the Placemarkers should be sorted and display in "Tab Order" or in "Alphabetical" order. When Tab Order button is selected, the Placemarkers are displayed in element order that is based upon the order in which elements were rendered to the Virtual cursor buffer. When the Alphabetical button is selected, the Placemarkers are displayed in alphabetical order. In the preferred embodiment, the Tab Order button is selected by default when the dialog box is opened; however, either button may be selected with the TAB key and then activated by pressing the ENTER key on the keyboard.

Figure 9:
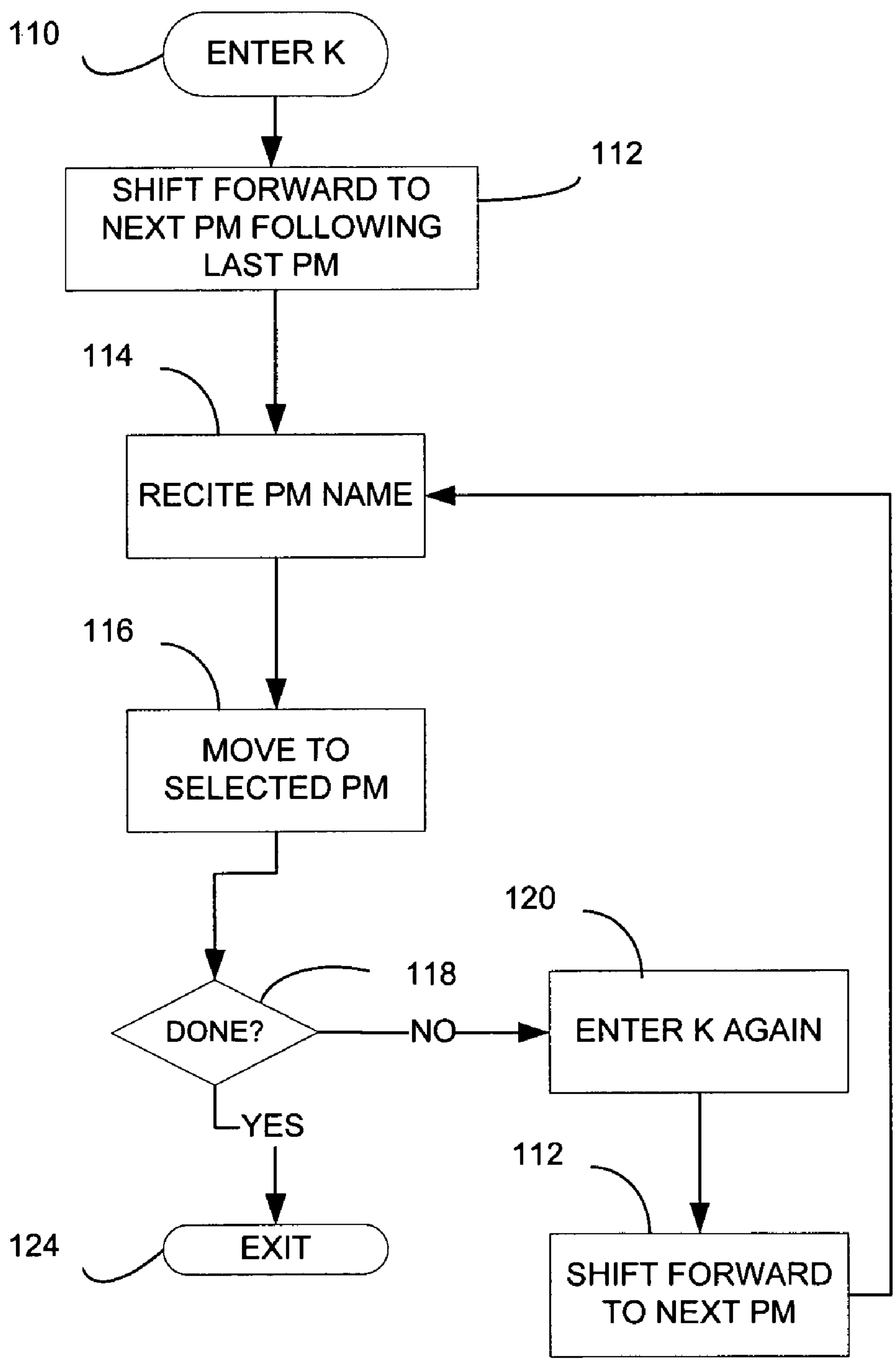
FIG. 9 is a flow chart illustrating a quick navigation feature that is included in the invention.

The present invention also includes a quick navigation feature that allows the user to select a previously defined Placemarker without opening the Placemarker dialog screen. The quick navigation feature is illustrated by the flow chart shown in FIG. 9 and is entered through block 110 by depressing the K key on the keyboard. The algorithm is responsive to the K key to shift forward in the document to the next Placemarker following the previously accessed Placemarker, as shown in functional block 112. The previously accessed Placemarker may be either the most recently added Placemarker or the previous Placemarker used, whichever occurred later. The JAWS® speech synthesizer then recites the newly selected Placemarker in functional block 114 and the subroutine moves to the place in the document corresponding to the newly selected Placemarker in functional block 116. The algorithm advances to decision block 118 and waits for another keystroke. If another K keystroke is entered, as shown in functional block 120, the algorithm again shifts forward in the document to the next Placemarker, as shown in functional block 122. The algorithm then returns to functional block 114, recites the name of the newly selected Placemarker and continues as described above. If a different keystroke is entered in decision block 118, the algorithm then exits through block 124 and proceeds to implement the action that corresponds to the entered keystroke. Also, the invention contemplates that cycling through the Placemarkers will wrap upon reaching the last Placemarker in the document. Thus, upon reaching the last Placemarker in the document, an additional K keystroke will cause the algorithm to move to the beginning of the document and search for the first Placemarker contained in the document.

Figure 10:
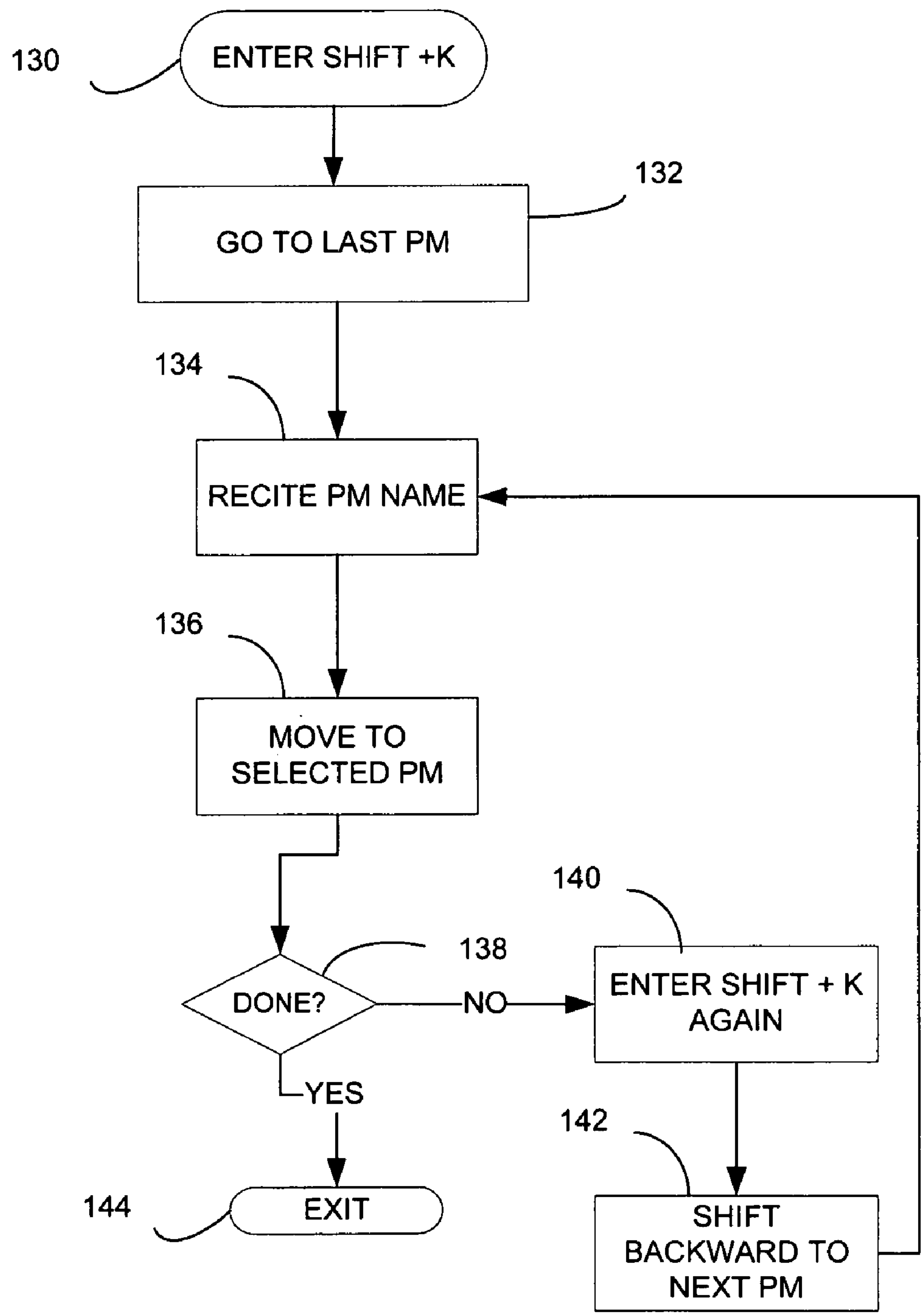
FIG. 10 is a flow chart illustrating another quick navigation feature that is included in the invention.

The present invention includes another quick navigation feature that is illustrated by the flow chart shown in FIG. 10 and that is entered through block 130 by depressing the SHIFT+K keys on the keyboard. The algorithm is responsive to the SHIFT+K keys to shift backward in the document to the previously accessed Placemarker, as shown in functional block 132. The previously accessed Placemarker may be either the most recently added Placemarker or the previous Placemarker used, whichever occurred later. The JAWS® speech synthesizer then recites the selected Placemarker in functional block 134 and the subroutine moves to the place in the document corresponding to the selected Placemarker in functional block 136. The algorithm then advances to decision block 138 and waits for another keystroke. If another set of SHIFT+K keystrokes are entered, as shown in functional block 140, the algorithm shifts further back in the document to the next Placemarker ahead of the current Placemarker, as shown in functional block 142. The algorithm then returns to functional block 134, recites the name of the newly selected Placemarker and continues as described above. If a different keystroke is entered in decision block 138, the algorithm then exits through block 144 and proceeds to implement the action that corresponds to the entered keystroke. Also, the invention contemplates that cycling through the Placemarkers will wrap upon reaching the top of the list first Placemarker in the document. Thus, upon reaching the first Placemarker in the document, additional SHIFT+K keystrokes will cause the algorithm to move to the end of the document and search for the last Placemarker contained in the document.

Figure 11:
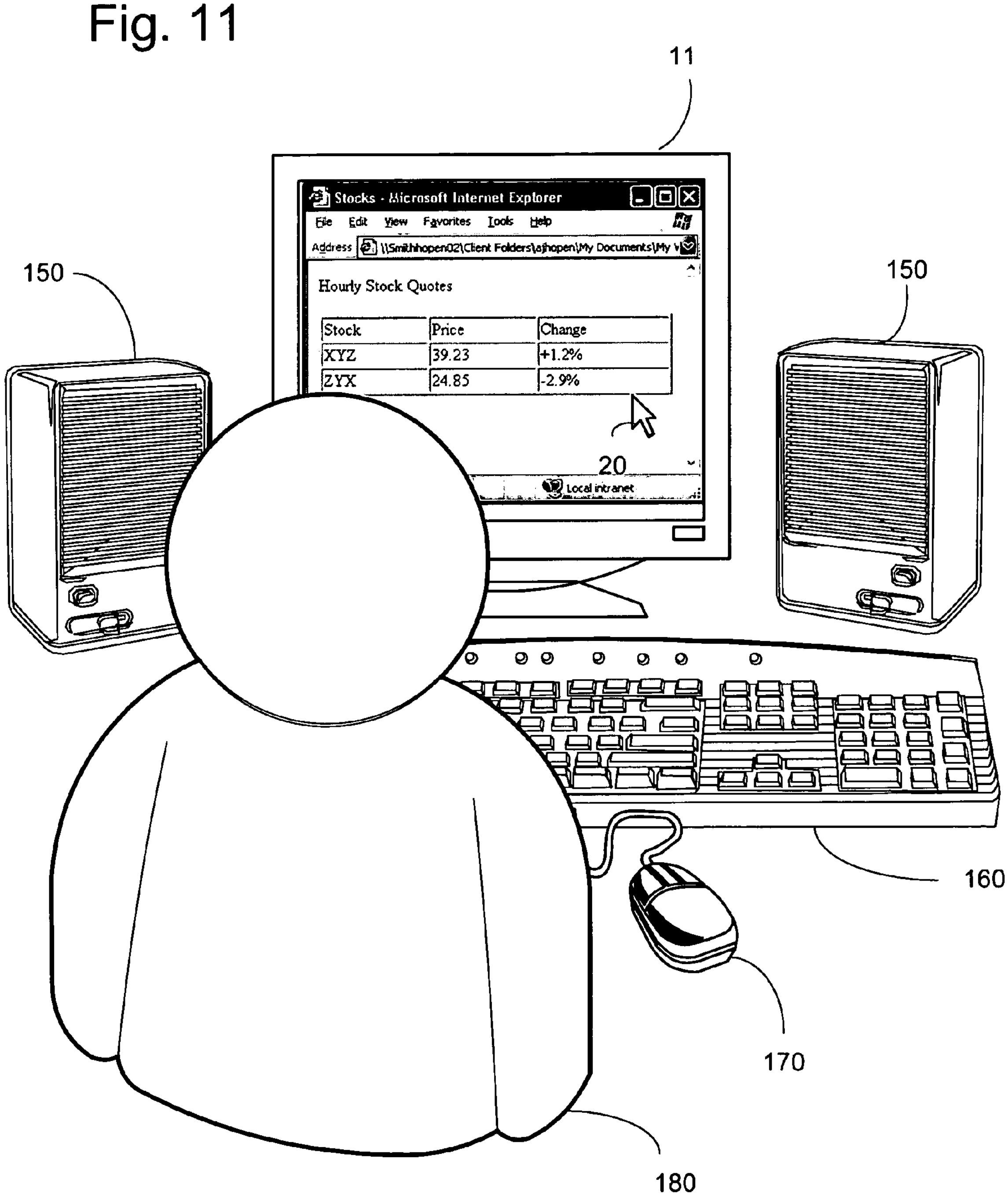
FIG. 11 is a view of a typical screen reader hardware configuration used by individuals.
Figure 12:
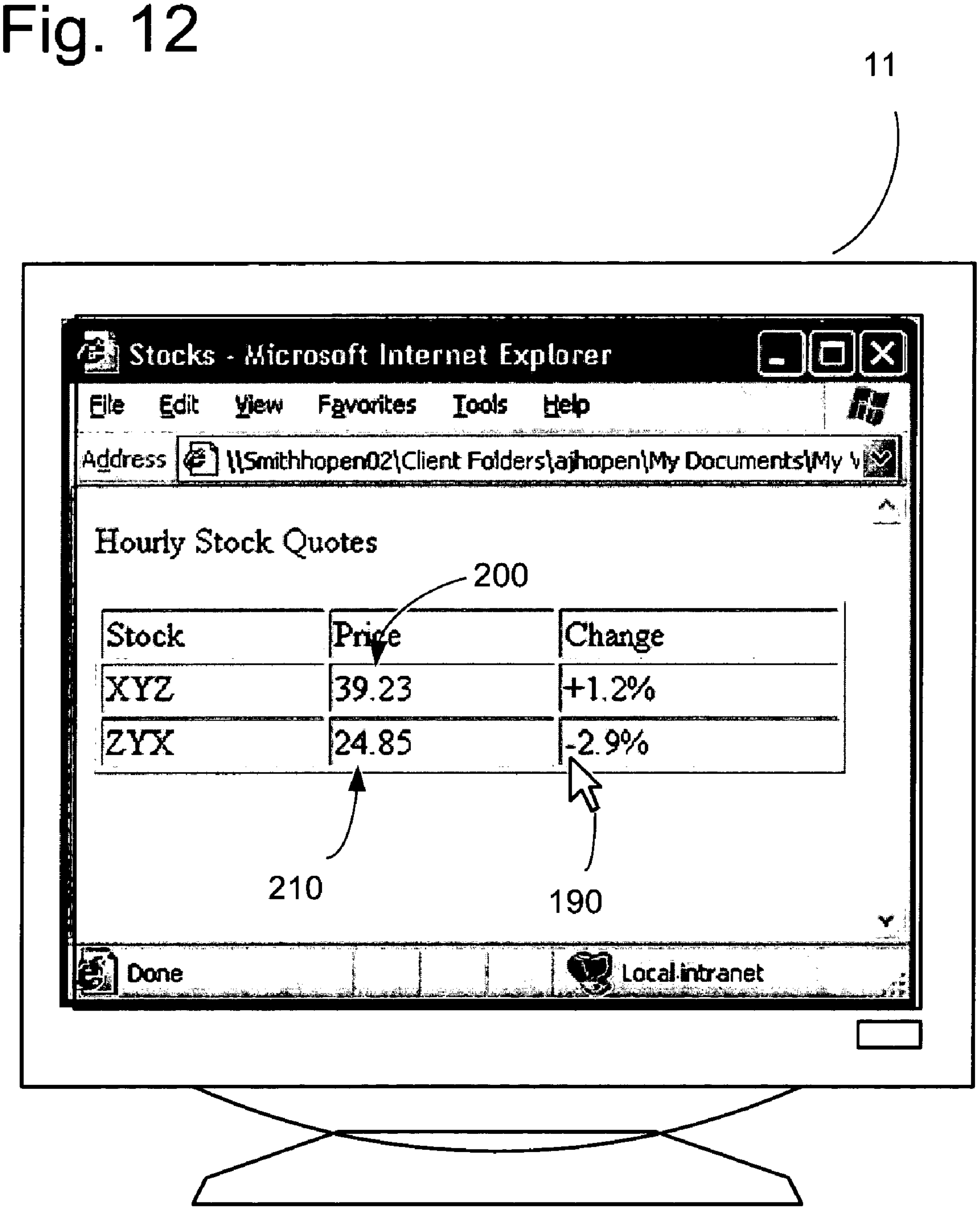
FIG. 12 is a web page display showing two dynamically changing stock prices.
Figure 13:
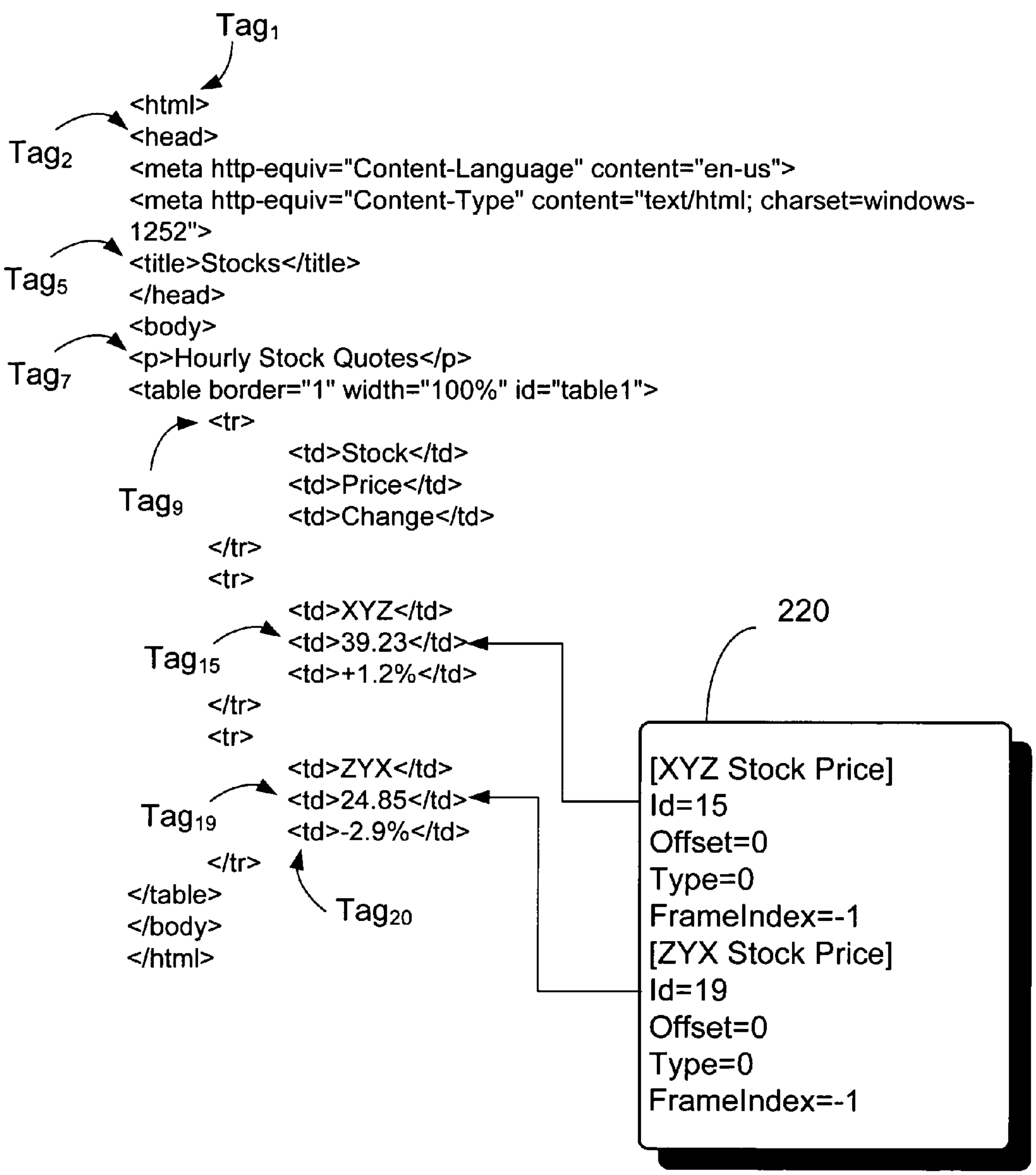
FIG. 13 shows underlying HTML source code for the web page of FIG. 12.

In FIG. 11, user 180 moves PC cursor 190 over the screen display 11 using mouse 170. Keyboard commands are accepted by user 180 through keyboard 160. JAWS® screen reader program interprets underlying code of web display and outputs speech to speakers 150. FIG. 12 illustrates a sample stock quote webpage that provides stock XYZ price 200 and stock ZYX price 210. User 180 moves cursor 190 to insert Placemarkers for each stock price. FIG. 13 shows the underlying HTML code for the stock quote webpage. Stock XYZ price 200 is located at $Tag_{15}$ and stock price ZYX is located at $Tag_{19}$. PMI file 220 shows an INI file structure wherein id=15 for XYZ stock price 200 and id=19 for ZYX stock price. As the stock price values immediately start from the $15^{th}$ or $19^{th}$ tag, no offset value is needed. As there is no frame set, the FrameIndex value is a null (i.e., −1).

The invention contemplates that the fixed Placemarkers are retained within their own proprietary Placemarker file that is written and read by the JAWS® screen reader program. In the preferred embodiment, the Placemarker file is utilizes. PMI extensions. Because the Placemarkers are stored in a separate file, the fixed Placemarkers are preserved when the user moves between pages or windows of the displayed document. However, the temporary Placemarkers are erased whenever the user moves between pages or windows of the displayed document. Additionally, the fixed Placemarkers may be used at a later date when a document is revisited, even if the document text has been changed, provided that there has not been too much structural change in the document. This feature is intended to facilitate returning to specific locations within favorite web sites. For example, if the user frequents a web site maintained by a retailer, the details of the web site may change with inventory changes, but the general layout of the web site will probably be the same. Thus, the user may mark portions of the web site of particular interest, such as, for example, audio equipment. Upon returning to the web site, the user would need only to activate the Placemarker for audio equipment. The algorithm would then move to the corresponding location on the web site and display audio equipment upon the computer monitor.

The invention also contemplates that the JAWS® speech synthesizer will recite the number of Placemarkers present on a page when the user returns to a previously viewed page. Additionally, because the Placemarkers are maintained within a separate JAWS® file that is totally independent of the document, users may exchange fixed Placemarkers with other users of JAWS®. Thus, neither the web page carrying the document nor the document itself is aware of the existence of the Placemarker file associated with the particular document, which is entirely different from prior art bookmark features. Site and Title information concerning the document also are stored in the Placemarker file and are utilized by JAWS® to determine which Placemarker file should be accessed for a particular document. The inventors expect that this feature will be most helpful on HTML based applications being used by multiple JAWS® users at a common location. With the present invention, the user independently loads the document through his application and uses JAWS® to both interact with and acquire data from the application and the document.

While the preferred embodiment has been illustrated and described in terms of the JAWS® screen reader, it will be appreciated that the invention also may be practiced with other types of screen readers. Additionally, it will be appreciated that the flow charts illustrated in the figures are exemplary and that the invention also can be practiced with flowcharts other than those specifically shown. Furthermore, the invention contemplates that a Braille display can be used in conjunction with, or in place of, an audio screen reader. In the former case, where the flow charts indicate recitation, the information would be displayed upon a Braille display while it is recited. In the later case, the information would only be displayed upon a Braille display with out any audio. In either case, the Braille display could either be available for a predetermined time period and then cleared or the Braille display could remain until replaced by the next usage.

To summarize, Placemarkers allow a user to quickly and easily navigate to commonly used areas of his favorite web pages or HTML documents. The user can utilize Placemarkers to jump between certain areas of a page, mark important sections of an HTML document, or indicate key form elements. For example, the user could use Placemarkers to move to required fields in a complicated form or specific paragraphs in a long HTML document.

The user presses Press K to move to the next Placemarker, or presses SHIFT+K to move to the prior Placemarker. Pressing CTRL+K places a temporary Placemarker. The invention also allows transfer to a numeric location of a Placemarker. To read or move to a specific Placemarker, the user presses CTRL+shift plus the numbers 1-N to read, and the same keystroke twice to move to the Placemarker. For example, to read the text at the location of the fifth Placemarker, the user presses CTRL+SHIFT+5. To move to the fifth Placemarker, press CTRL+SHIFT+5 twice quickly.

Pressing CTRL+SHIFT+K to displays a list of all Placemarkers on the current page. Use the UP/DOWN ARROW keys to select a Placemarker in the list. Then press SPACEBAR on the Move To button or press ALT+M to move the virtual cursor to the Placemarker's location on the page.

To Add a Placemarker:

Open a web page or other HTML document. Move the cursor to the location on the page where you want to put the Placemarker. Press CTRL+SHIFT+K. Press SPACEBAR on the Add button or press ALT+A. JAWS suggests a name for the Placemarker based on the text present at the cursor's current location. The user may enter a new name if necessary. Press SPACEBAR on the OK button to add the Placemarker to this page.

To Change the Name of a Placemarker:

The user opens the page containing the Placemarker that he wants to rename. The user presses CTRL+SHIFT+K to display a list of Placemarkers on this page. The user uses the UP/DOWN arrow keys to select the Placemarker. He then presses the SPACEBAR on the Change Name button or presses ALT+C. He enters a new name for the Placemarker and then press SPACEBAR on the OK button. Placemarkers added in this way remain there until the user removes them. The user can add a temporary Placemarker by pressing CTRL+K. Temporary Placemarkers only remain for the current session, and only one temporary Placemarker exists at a time.

To Remove One or More Placemarkers:

The user open the page containing the Placemarker you want to delete. He then presses CTRL+SHIFT+K to display a list of all Placemarkers on the current page. He uses the UP/DOWN ARROW keys to select a Placemarker. The user then presses SPACEBAR on the Remove button or press ALT+R to delete the Placemarker. If the user wants to delete all Placemarkers for this page, he presses SPACEBAR on the Remove All button or press ALT+L.

To Share the Placemarkers with Other JAWS Users:

The user presses WINDOWS KEY+E to start Windows Explorer. He then goes to the drive and folder where you installed JAWS. He opens the SETTINGS\ENU\Placemarkers folder. Placemarker information is stored in .PMI files. Locate the .PMI file with the same name as the page containing the Placemarkers user wants to share. The user copies this file and distribute it to other users. These users then need to copy the .PMI file into the JAWS5O\SETTTNGS\ENTJ\Placemarkers folder on their computers. The users can now navigate that HTML page with your Placemarkers.

Figure 14:
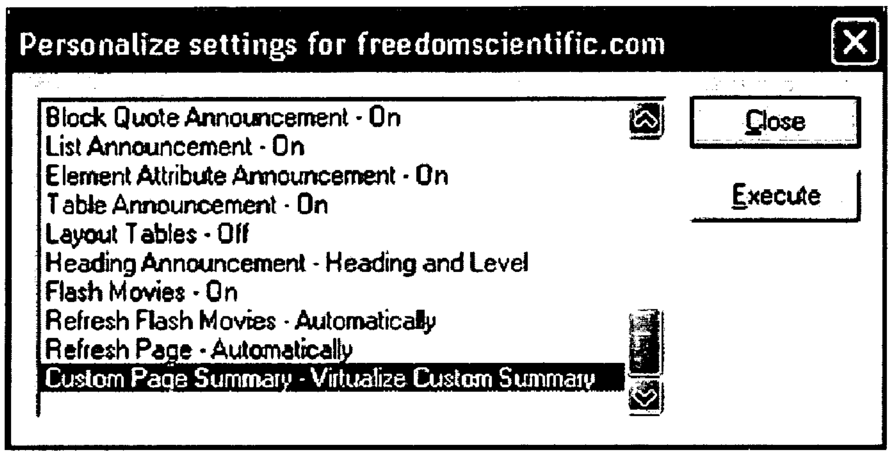
FIG. 14 shows a dialog box for personalizing settings according to an embodiment of the invention.
Figure 15:
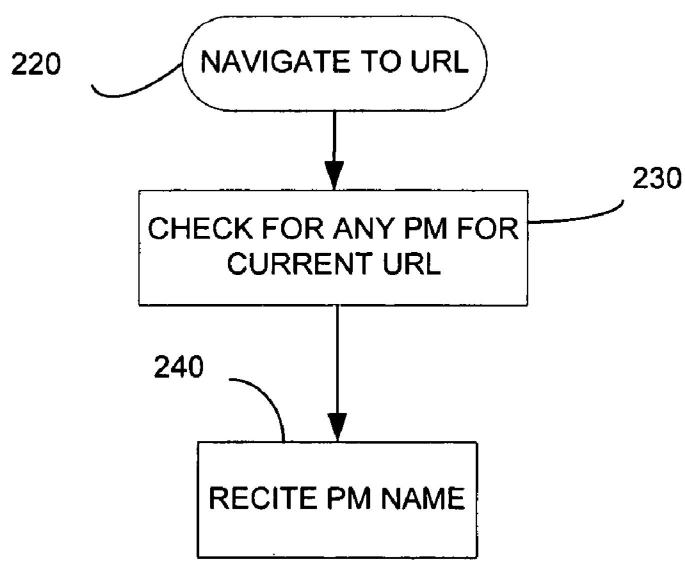
FIG. 15 is a flow chart illustrating the execution of the Placemarkers responsive to the navigation to a URL having preset Placemarkers.

To Automatically Play the Placemarkers Responsive to Navigation to a URL:

The user presses INSERT SHIFT V which opens the Personalize Settings Dialog (FIG. 14). The user presses C to move to the Custom Page Summary Speak Custom Summary choice and taps the space bar one time. The user toggles to read: Virtualize Custom Summary and presses Enter to accept. After navigating to a URL with preexisting Placemarkers, the Virtual Viewer display appears on top and it will contain the Placemarker information. The user can stop the automatic reading and arrow around in the text with both speech and Braille.

The names you created for the PlaceMarkers are shown here as links. If you move to one and press enter, the Virtual Viewer goes away, and you land back on the Fast Quotes Page on the Line of the place Marker. Forms Mode is turned off at that point and you can arrow around. Use F to go back to the Symbols Edit Field and press enter for Forms Mode to find another Symbol. Note that if you just press Escape from the Virtual Viewer, you will land back on the Fast Quotes Page and still be in Forms Mode as expected.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

The invention claimed is:

1. A method of marking the position of a string in a document comprising the steps of: retrieving the document, establishing a cursor location in the document associated with the beginning of the string, parsing the source HTML in the document for a positional value representative of the number of HTML tags prior to the cursor location, identifying the URL of the document, and storing the positional value and the URL on a computer accessible medium.

2. The method of claim 1 further comprising the steps of: requesting the document associated with the URL, retrieving the positional value and URL from the computer accessible medium, parsing the source HTML in the document until the quantity of tags parsed equals the positional value, and outputting the string at the cursor location.

3. The method of claim 2 wherein the step of outputting the string is executed by an output means selected from the group consisting of a speech synthesizer, a Braille reader, a screen magnification application, and a pop-up display window.

4. A method of marking the position of a string in a document comprising the steps of: retrieving the document, establishing a cursor location in the document associated with the beginning of the string, parsing the source HTML in the document for a positional value representative of the number of HTML tags prior to the cursor location, identifying the URL of the document, storing the positional value and the URL on a computer accessible medium;requesting the document associated with the URL, retrieving the positional value for the URL from the computer accessible medium, parsing the source HTML in the document until the quantity of tags parsed equals the positional value, and outputting the string by an output means selected from the group consisting of a speech synthesizer, a Braille reader, a screen magnification application, and a pop-up display window.

5. A method of claim 4 further comprising the step of outputting the string responsive to navigation to the associated URL.

6. The method of claim 4 further comprising step of storing a position for an entire domain whereby common headers that propagate across an entire domain are bypassed so that output begins at a location in the HTML that is distinct between web pages in the domain.

7. A method of marking the position of a string in a webpage comprising the steps of: retrieving a webpage, establishing a cursor location in the webpage associated with the beginning of the dynamically changing string, parsing the source HTML in the webpage for a positional value representative of the number of HTML tags prior to the cursor location, identifying the URL of the webpage, storing the positional value and the URL on a computer accessible medium retrieving the positional value and URL from the computer accessible medium, requesting the webpage associated with the URL, responsive to requesting the webpage associated with the URL, automatically parsing the source HTML in the webpage until the quantity of tags parsed equals the positional value, and automatically outputting the string by an output means selected from the group consisting of a speech synthesizer, a Braille reader, a screen magnification application, and a pop-up display window.

* * * * *

US006993707C1

(12) EX PARTE REEXAMINATION CERTIFICATE (9576th)

United States Patent

(10) Number: US 6,993,707 C1

(45) Certificate Issued: Mar. 26, 2013

Baker et al.

(54) DOCUMENT PLACEMARKER

(75) Inventors: David Baker, Portland, OR (US); Walter L. Smith, St. Petersburg, FL (US)

(73) Assignee: Churchill Financial LLC, New York, NY (US)

Reexamination Request:
No. 90/010,473, Mar. 27, 2009

Reexamination Certificate for:

| | |
|---|---|
| Patent No.: | **6,993,707** |
| Issued: | **Jan. 31, 2006** |
| Appl. No.: | **10/710,849** |
| Filed: | **Aug. 6, 2004** |

Related U.S. Application Data

(60) Provisional application No. 60/493,707, filed on Aug. 8, 2003.

(51) Int. Cl.
*G06F 17/21* (2006.01)

(52) U.S. Cl.
USPC .................. 715/241; 707/E17.114; 715/205; 715/273

(58) Field of Classification Search ........................ None
See application file for complete search history.

(56) References Cited

To view the complete listing of prior art documents cited during the proceeding for Reexamination Control Number 90/010,473, please refer to the USPTO's public Patent Application Information Retrieval (PAIR) system under the Display References tab.

*Primary Examiner* — Behzad Peikari

(57) ABSTRACT

A method of saving and retrieving a selected string on an HTML-based document. A cursor is placed at a location on the document. The number of HTML tags are counted between the beginning of the document and the position of the cursor. The count of HTML tags is saved in association with the URL of the document. When the document at the URL is retrieved at a later time, the string at the location of the previously set cursor is retrieved and communicated to the end user.

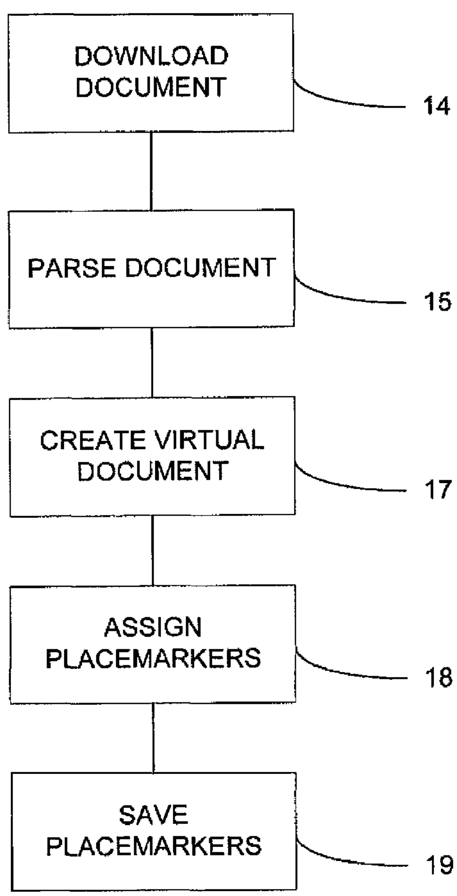

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *